United States Patent
Xu (10) Patent No.: US 10,205,348 B2
(45) Date of Patent: Feb. 12, 2019

(54) WIRELESS ENERGY TRANSMISSION CONTROL METHODS AND CONTROL APPARATUSES

(71) Applicant: Beijing Zhigu Rui Tuo Tech Co., Ltd, Beijing (CN)

(72) Inventor: Ran Xu, Beijing (CN)

(73) Assignee: BEIJING ZHIGU RUI TUO TECH CO., LTD, Beijing (CN)

( * ) Notice: Subject to any disclaimer, the term of this patent is extended or adjusted under 35 U.S.C. 154(b) by 208 days.

(21) Appl. No.: 15/317,852

(22) PCT Filed: Jun. 5, 2015

(86) PCT No.: PCT/CN2015/080832
§ 371 (c)(1),
(2) Date: Dec. 9, 2016

(87) PCT Pub. No.: WO2015/188724
PCT Pub. Date: Dec. 17, 2015

(65) Prior Publication Data
US 2017/0141612 A1    May 18, 2017

(30) Foreign Application Priority Data
Jun. 12, 2014   (CN) .......................... 2014 1 0259658

(51) Int. Cl.
*H02J 50/10*   (2016.01)
*H02J 50/90*   (2016.01)
(Continued)

(52) U.S. Cl.
CPC .............. *H02J 50/10* (2016.02); *H02J 7/025* (2013.01); *H02J 50/80* (2016.02); *H02J 50/90* (2016.02); *H02J 50/20* (2016.02)

(58) Field of Classification Search
CPC .. H02J 50/10; H02J 50/80; H02J 50/90; H02J 7/025; H02J 50/20
See application file for complete search history.

(56) References Cited

U.S. PATENT DOCUMENTS 8,410,953 B2   4/2013 Zeine
8,729,735 B2   5/2014 Urano
(Continued)

FOREIGN PATENT DOCUMENTS

CN   102082469 A   6/2011
CN   102709993 A   10/2012
(Continued)

OTHER PUBLICATIONS

International Search Report for PCT Application No. PCT/CN2015/080832, dated Aug. 19, 2015, 4 pages.

*Primary Examiner* — Daniel Cavallari
(74) *Attorney, Agent, or Firm* — Amin, Turocy & Watson, LLP (57) ABSTRACT

Wireless charging technology and wireless energy transmission control methods and control apparatuses are disclosed. A method comprises: receiving an optical signal from a wireless energy receiver device; and determining, according to an orientation of the optical signal, a wireless energy transmission scheme of a wireless energy transmitter device corresponding to the orientation. A corresponding wireless energy transmission scheme can be rapidly determined according to an orientation of an optical signal from a receiver device.

36 Claims, 7 Drawing Sheets

S110 — Receive an optical signal from a wireless energy receiver device

S120 — Determine, according to an orientation of the optical signal, a wireless energy transmission scheme of a wireless energy transmitter device corresponding to the orientation (51) Int. Cl.
*H02J 50/80* (2016.01)
*H02J 7/02* (2016.01)
*H02J 50/20* (2016.01)

(56) References Cited

U.S. PATENT DOCUMENTS

| | | | |
|---|---|---|---|
| 9,800,091 B2* | 10/2017 | Nugent, Jr. | H04B 10/807 |
| 9,831,920 B2* | 11/2017 | Perry | H04B 5/0037 |
| 2011/0266995 A1 | 11/2011 | Winfield et al. | |
| 2015/0333799 A1* | 11/2015 | Perry | G10K 11/346 320/108 |
| 2015/0333800 A1* | 11/2015 | Perry | G10K 11/346 320/108 |
| 2016/0268813 A1* | 9/2016 | Reynolds | H02J 5/005 |

FOREIGN PATENT DOCUMENTS

| | | |
|---|---|---|
| CN | 103812230 A | 5/2014 |
| CN | 104037954 A | 9/2014 |
| JP | 2002198873 A | 7/2002 |

* cited by examiner

| Position coordinate | Phase setting |
|---|---|
| $(x_1, y_1)$ | $(\theta_1, \theta_2, \ldots, \theta_n)$ |
| $(x_2, y_2)$ | $(\theta_1', \theta_2', \ldots, \theta_n')$ |
| ... | ... |
| $(x_k, y_k)$ | $(\theta_1'', \theta_2'', \ldots, \theta_n'')$ |

FIG. 3(a)

| Position coordinate | | Phase setting |
|---|---|---|
| $(x_1, y_1)$ | $z_1$ | $(\theta_1, \theta_2, \ldots, \theta_n)$ |
| | $z_2$ | $(\theta_{1'}, \theta_{2'}, \ldots, \theta_{n'})$ |
| | ... | ... |
| | $z_k$ | $(\theta_{1''}, \theta_{2''}, \ldots, \theta_{n''})$ |
| $(x_2, y_2)$ | $z_1$ | $(\alpha_1, \alpha_2, \ldots, \alpha_n)$ |
| | $z_2$ | $(\alpha_{1'}, \alpha_{2'}, \ldots, \alpha_{n'})$ |
| | ... | ... |
| | $z_k$ | $(\alpha_{1''}, \alpha_{2''}, \ldots, \alpha_{n''})$ |
| | ... | ... |
| $(x_k, y_k)$ | $z_1$ | $(\beta_1, \beta_2, \ldots, \beta_n)$ |
| | $z_2$ | $(\beta_{1'}, \beta_{2'}, \ldots, \beta_{n'})$ |
| | ... | ... |
| | $z_k$ | $(\beta_{1''}, \beta_{''}, \ldots, \beta_{n''})$ |

WIRELESS ENERGY TRANSMISSION CONTROL METHODS AND CONTROL APPARATUSES

RELATED APPLICATION

The present application is a U.S. National Stage filing under 35 U.S.C. § 371 of international patent cooperation treaty (PCT) application No. PCT/CN2015/080832, filed Jun. 5, 2015, and entitled "WIRELESS ENERGY TRANSMISSION CONTROL METHODS AND CONTROL APPARATUSES", which claims the benefit of priority to Chinese Patent Application No. 201410259658.4, filed with the Chinese Patent Office on Jun. 12, 2014 which applications are hereby incorporated herein into the present application by reference in their respective entireties.

TECHNICAL FIELD

The present application relates to the field of wireless charging technologies, and in particular, to wireless energy transmission control methods and control apparatuses.

BACKGROUND

In recent years, wireless charging technology has attracted more and more attention. In order to enable a wireless energy receiver device to have a high receive power, a wireless energy transmitter device can schedule wireless energy transmission based on some standards. For example, there is a microwave energy transmission-based wireless energy transmission technology in which the transmit phase of a transmitter device is adjusted to schedule wireless energy transmission when the position of the receiver device is changed. In this technology, the transmitter device has a transmit node array consisting of a plurality of emitter nodes, and after the position of the receiver device is changed, the transmitter device adjusts the phases of the emitter nodes properly, and an adjustment process is described as follows: the phase of a first node for transmitting wireless energy is adjusted through a charging feedback from the receiver device, after the phase of the first node is adjusted to a specific value at which the receiver device can achieve high receiving efficiency, the phase of a second node for transmitting wireless energy is adjusted by using the phase of the first node as a reference, and the phases of the rest emitter nodes are adjusted one by one in the same manner until the phases of all the emitter nodes have been adjusted. Naturally, due to the large number of emitter nodes, such adjustment of phases may take a long time (e.g., several seconds).

SUMMARY

An example, non-limiting objective of the present application is to provide a wireless energy transmission control solution.

To these and/or related ends, in a first aspect, an example embodiment of the present application provides a wireless energy transmission control method, wherein the method comprises:

receiving an optical signal from a wireless energy receiver device; and determining, according to an orientation of the optical signal, a wireless energy transmission scheme of a wireless energy transmitter device corresponding to the orientation.

In a second aspect, an example embodiment of the present application provides a wireless energy transmission control apparatus, wherein the apparatus comprises:

a receiving module, configured to receive an optical signal from a wireless energy receiver device; and a first determining module, configured to determine, according to an orientation of the optical signal, a wireless energy transmission scheme of a wireless energy transmitter device corresponding to the orientation.

In a third aspect, an example embodiment of the present application provides a computer readable storage device, comprising at least one executable instruction, which, in response to execution, causes a system comprising a processor to perform operations, comprising:

receiving an optical signal from a wireless energy receiver device; and determining, according to an orientation of the optical signal, a wireless energy transmission scheme of a wireless energy transmitter device corresponding to the orientation.

In a fourth aspect, an example embodiment of the present application provides a device for wireless energy transmission control, comprising a processor and a memory, wherein the memory storing a computer executable instruction, the processor being connected with the memory via a communication bus, and when the device is operating, the processor executes or facilitates execution of the executable instructions stored by the memory to cause the device to perform operations, comprising:

receiving an optical signal from a wireless energy receiver device; and determining, according to an orientation of the optical signal, a wireless energy transmission scheme of a wireless energy transmitter device corresponding to the orientation.

According to one or more of the methods and the apparatuses in the example embodiments of the present application, a corresponding wireless energy transmission scheme can be rapidly determined according to an orientation of an optical signal from a receiver device.

DETAILED DESCRIPTION

Example embodiments of the present application are further described in detail with reference to the accompanying drawings in which like elements are denoted by like reference numerals. The following embodiments are intended to describe the present application, but not to limit the scope of the present application.

A person skilled in the art may understand that terms such as "first" and "second" in the present application are merely used to distinguish different steps, devices, modules or the like, and neither indicate any specific technical meanings nor indicate necessary logic orders of them.

In the embodiments of the present application, a transmitter device refers to a device that can transmit wireless energy, and especially refers to a microwave energy transmission-based transmitter device, which has a plurality of emitter nodes. A receiver device refers to a device that can be charged in a wireless manner. The "transmitter" and "receiver" are merely used to distinguish roles that can be played during wireless charging, and are not used to strictly limit functions of the devices. The transmitter device may be used as a receiver device, and the receiver device may also be configured to transmit wireless energy.

Figure 1:
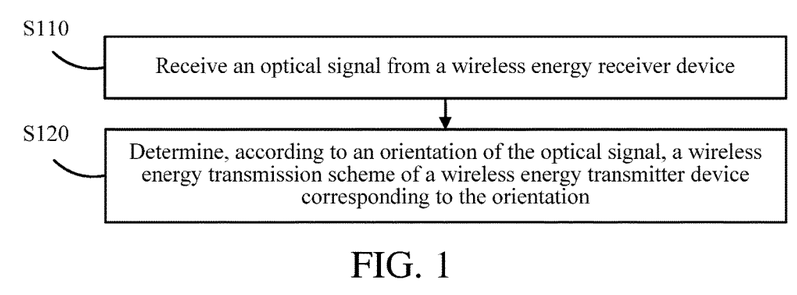
FIG. 1 is an example schematic flowchart of a wireless energy transmission control method according to an example embodiment of the present application.

A method according to this embodiment of the present application can be run at the transmitter side, and performed by a wireless energy transmission control apparatus, wherein the apparatus may belong to or independent of a transmitter device, or may also be the transmitter device itself. As shown in FIG. 1, a wireless energy transmission control method according to an embodiment of the present application comprises:

S110: Receive an optical signal from a wireless energy receiver device.

In the method according to this embodiment of the present application, the receiver device transmits an optical signal to a wireless energy transmitter device in response to the receiver device requesting to receive or in response to receiving wireless energy, and in step S110, the wireless energy transmission control apparatus receives the optical signal.

S120: Determine, according to an orientation of the optical signal, a wireless energy transmission scheme of a wireless energy transmitter device corresponding to the orientation.

In a possible implementation of the method according to this embodiment of the present application, the "orientation" may indicate the transmission direction of the optical signal, wireless energy transmission schemes corresponding to optical signals in different directions may be preset by the wireless energy transmission control apparatus, and the wireless energy transmission scheme is such a scheme that a corresponding receiver device can have highest receive power. A relative relationship between the orientation and the wireless energy transmission scheme may be learned and stored in a manner of performing offline training at as many positions as possible in the coverage of the wireless energy transmitter device.

According to the method according to this embodiment of the present application, a corresponding wireless energy transmission scheme can be rapidly determined based on an orientation of an optical signal from a receiver device.

In a possible implementation, the determining a wireless energy transmission scheme in step S120 may comprise:

determining a transmit phase of the wireless energy, e.g., determining phases of some or all of emitter nodes of the transmitter device for transmitting the wireless energy.

Figure 2A:
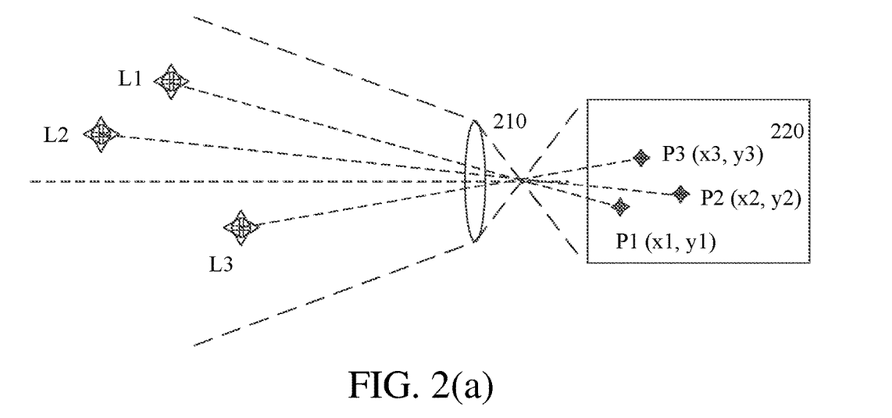
FIG. 2(a) and FIG. 2(b) are example schematic diagrams of a wireless energy transmission scenario according to an example embodiment of the present application.
Figure 3A:
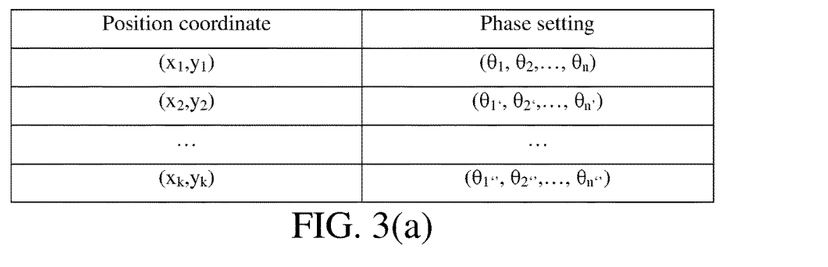
FIG. 3(a) and FIG. 3(b) are example schematic diagrams of a lookup table in a wireless energy transmission control method according to an example embodiment of the present application.

In the method according to this embodiment of the present application, in step S110, the optical signal from the wireless energy receiver device is received by using a photosensitive element (also referred to as an image sensor, for example, a charge coupled device (CCD), or a complementary metal-oxide semiconductor (CMOS)). The photosensitive element consists of a plurality of photosensitive units (pixels), and optical signals in different orientations are received directly or indirectly by photosensitive units at different positions of the photosensitive element. Therefore, the positions of the photosensitive units may be associated with wireless energy transmission schemes, thereby indirectly implement association between the optical signals in different orientations and the wireless energy transmission schemes. For example, each set number (for example, one, four, or eight) of photosensitive units correspond to a set of phase settings of the wireless energy transmitter device, and the set of phase settings comprises a phase settings of some or all of emitter nodes of the wireless energy transmitter device. As shown in FIG. 2(*a*), an optical signal transmitted by a first receiver device L1 passes through a light splitting apparatus 210 and then is received by a photosensitive unit at a first receive position P1 of a photosensitive element 220, an optical signal transmitted by a second receiver device L2 is received by a photosensitive unit at a second receive position P2, an optical signal transmitted by a third receiver device L3 is received by a photosensitive unit at a third receive position P3, and the photosensitive units at the three receive positions are associated with three sets of phase settings. An association relationship may be stored in the wireless energy transmission control apparatus in a form of lookup table shown in FIG. 3(*a*). As shown in FIG. 3(*a*), each entry included in the lookup table comprises a two-dimensional coordinate (x, y) of a receive position on the photosensitive element and a corresponding set of phase settings.

Correspondingly, step S120 may comprise:

S121: Determine a position, at which the optical signal is received, on the photosensitive element. For each photosensitive element, each photosensitive unit has a fixed coordinate position on the photosensitive element. After a photosensitive element at one position receives an optical signal, the optical signal is reflected in a form of charges.

S122: Determine the transmission scheme according to the position. After the position is determined, the transmission scheme associated with the position may be determined by, for example, looking up the lookup table.

Figure 2B:
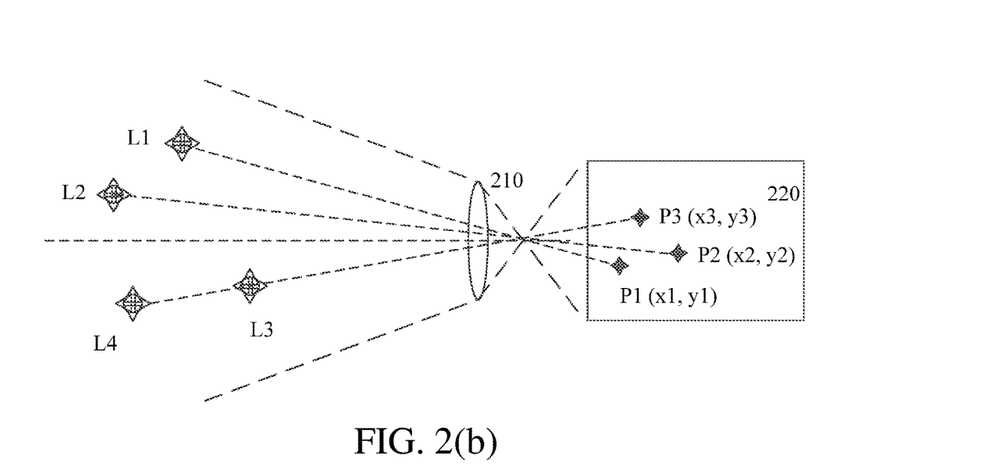
Figure 3B:
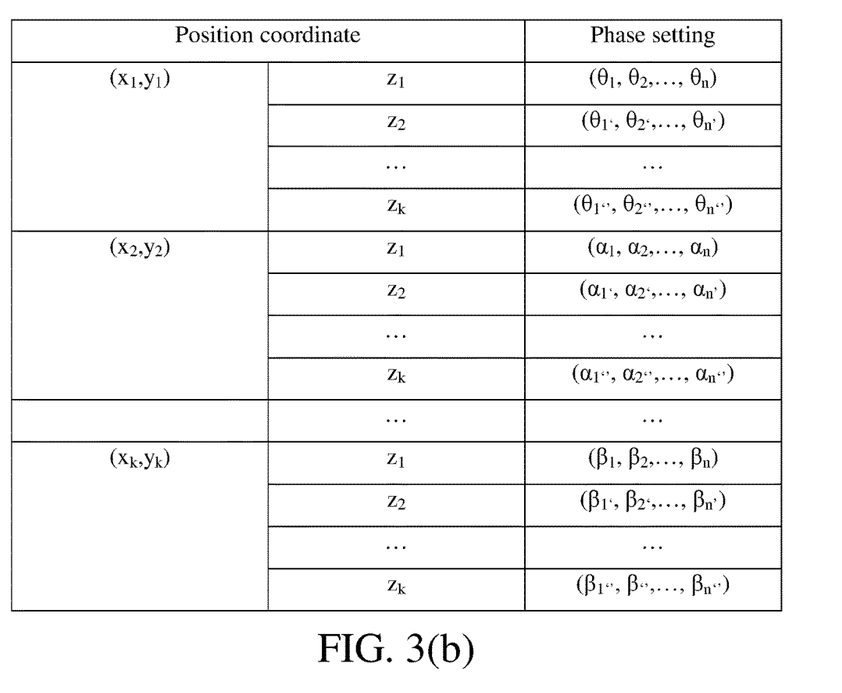

Optical signals transmitted by receiver devices at different positions (especially referring to different distances from the transmitter device) may have a same transmission direction, and positions of photosensitive units receiving the optical signal may also be the same. As shown in FIG. 2(*b*), the optical signal transmitted by the third receiver device L3 is received by the photosensitive unit at the third receive position P3, and an optical signal transmitted by a fourth receiver device L4 may also be received by the photosensitive unit at the third receive position P3. Therefore, in order to charging the receiver device more efficiently, in another possible implementation, the "orientation" may further indicate three-dimensional position information of the receiver device, i.e. the "orientation" comprises a transmission direction of an optical signal and a distance between a wireless energy receiver device transmitting the optical signal and a photosensitive element. In this case, positions of photosensitive units of the photosensitive element may still be associated with wireless energy transmission schemes, thereby indirectly implement association between the orientations and the wireless energy transmission schemes. The association relationship may still be learned and stored in a manner of performing offline training at as many positions at possible within coverage of the wireless energy transmitter device, for example, each set number (for example, one, four, or eight) of photosensitive units and a specific distance are associated with a set of phase settings of the wireless energy transmitter device, and the set of phase settings comprises phase settings of some or all of the emitter nodes of the wireless energy transmitter device. The association relationship may be stored in the wireless energy transmission control apparatus in a form of lookup table shown in FIG. 3(b). As shown in FIG. 3(b), each entry included in the lookup table comprises a two-dimensional coordinate (x, y) of a receive position, a distance (z) between a receiver device and the photosensitive element, and a corresponding set of phase settings.

Step S120 may comprise:

S121': Determine a position, at which the optical signal is received, on the photosensitive element.

S122': Determine the transmission scheme according to the position and the distance. After the position is determined, the transmission scheme associated with the photosensitive unit at the position and the distance may be determined by, for example, looking up the lookup table.

Correspondingly, the method according to this embodiment of the present application further comprises:

S130: Determine a distance between the receiver device and the photosensitive element, as will be further described below.

In still another possible implementation, the optical signal is used to indicate status information of the receiver device. The status information may comprise at least one of the following information of the receiver device: a remaining power, charging efficiency, and the like. The manner of indicating the status information by using the optical signal may comprise several types, for example, different status information is indicated by using optical signals of different frequencies (colors), wherein a frequency F1 corresponds to a value of the remaining power between 0% and 20%; a frequency F2 corresponds to a value of the remaining power between 20% and 40%; a frequency F3 corresponds to a value of the remaining power between 40% and 60%; a frequency F4 corresponds to a value of the remaining power between 60% and 80%; and a frequency F5 corresponds to a value of the remaining power between 80% and 100%. Optical signals of different intensity indicates different status information, wherein optical intensity I1 corresponds to a high charging efficiency; optical intensity I2 corresponds to a medium charging efficiency; and optical intensity I3 corresponds to a low charging efficiency. The status information may be modulated on the optical signal, and in this case, a light source, for example, a light emitting diode (LED), which can be used in visible light communication (VLC), may be disposed on the receiver device. In this implementation, the determining a wireless energy transmission scheme in step S120 may comprise:

determining transmission power of the wireless energy according to the status information. The transmission power refers to the wireless energy transmitted over a unit time. Different transmit power may achieve different transmission power.

Correspondingly, the method according to this embodiment of the present application further comprises:

S140: Determine the status information of the receiver device.

In the case that the status information is indicated by different frequencies or different optical intensity, the different frequencies and the different optical intensity may be determined by using the photosensitive element, so as to determine corresponding status information. In an implementation in which using data to carry status information, the status information is obtained by demodulating the optical signal, and the way to demodulate the optical signal is a mature technology in the art.

In step S130, the distance may be determined in multiple ways.

In a possible implementation, the distance may be determined directly in an optical manner by using the photosensitive element. For example, the photosensitive element is a photosensitive element of a Time-of-Flight (TOF) camera, and the distance may be obtained directly through measurement in combination with a distance measurement algorithm of the TOF camera.

In another possible implementation, the distance may be determined according to transmit information of the receiver device and receive information of the transmitter device. The transmit information of the receiver device may comprise: a time of transmitting the optical signal by the receiver device, transmit power of transmitting the optical signal by the receiver device, and a modulus of a radiation lobe of the receiver device. The receive information of the transmitter device may comprise: receive power of receiving the optical signal by the transmitter device, channel status information between the transmitter device and the receiver device, a time of receiving the optical signal by the transmitter device, and the like. The distance d may be calculated according to, for example, the following formula (1):

$$P_R = K \frac{1}{d^{n+3}} \quad (1)$$

wherein, $$K = (n+1)A_R h^{n+1} P_T / 2\pi;$$

$P_R$ is the receive power of receiving the optical signal by the transmitter device; $P_T$ is the transmit power of transmitting the optical signal by the receiver device; n is the modulus of the radiation lobe of the receiver device, $n = -\ln(2)/\ln(\cos \Phi_{1/2})$ $\Phi_{1/2}$ indicates a view angle of a light source of the receiver device at half power; $A_R$ is the size of the photosensitive element, h is the channel status information between the transmitter device and the receiver device, and the information may be estimated by the transmitter device based on the received signal.

The distance d may also be calculated according to the following formula (2):

$$d = c(t_R - t_T) \quad (2)$$

wherein, $t_T$ is the time of transmitting the optical signal by the receiver device; $t_R$ is the time of receiving the optical signal by the transmitter device; and c is the speed of light.

Correspondingly, the method according to this embodiment of the present application further comprises:

S150: Determine the transmit information of the receiver device and the receive information of the transmitter device. Similarly to the status information, the transmit information of the receiver device may also be obtained by demodulating the optical signal. The receive information of the transmitter device may be obtained directly from the transmitter device by the wireless energy transmission control apparatus.

To sum up, in the method according to this embodiment of the present application, a phase setting of a transmitter device can be rapidly determined by using the orientation of an optical signal transmitted by a receiver device, without the need of determining and adjusting transmit phases of all emitter nodes one by one; in addition, proper transmission power may be determined based on the optical signal, so that more targeted energy transmission can be performed, and easy to implement.

A person skilled in the art may understand that in the foregoing method of the specific implementation of the present application, sequence numbers of the steps do not indicate execution sequences, and the execution sequences of the steps should be determined according to functions and inner logic thereof, and should not constitute any limitation to implementation processes of the specific implementation of the present application.

Figure 4:
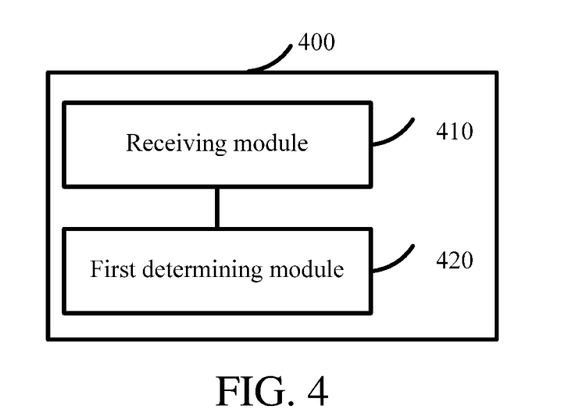
FIG. 4 is an example schematic structural diagram of a wireless energy transmission control apparatus according to an example embodiment of the present application.

The present application further provides a wireless energy transmission control apparatus for performing the wireless energy transmission control method. The apparatus may belong to or independent of a transmitter device, and may also be the transmitter device itself. As shown in FIG. 4, a wireless energy transmission control apparatus 400 in an embodiment of the present application comprises a receiving module 410 and a first determining module 420.

The receiving module 410 is configured to receive an optical signal from a wireless energy receiver device.

The receiver device may transmit an optical signal to a wireless energy transmitter device in response to the receiver device requests to receive or in response to receiving wireless energy. In the apparatus according to this embodiment of the present application, the receiving module 410 may be configured to receive the optical signal.

The first determining module 420 is configured to determine, according to an orientation of the optical signal, a wireless energy transmission scheme of a wireless energy transmitter device corresponding to the orientation.

In a possible implementation of the apparatus according to this embodiment of the present application, the "orientation" may indicate the transmission direction of the optical signal, wireless energy transmission schemes corresponding to optical signals in different directions may be preset in the wireless energy transmission control apparatus, and the wireless energy transmission scheme is such a scheme that a corresponding receiver device can have highest receive power. A relative relationship between the orientation and the wireless energy transmission scheme may be learned and stored in a manner of performing offline training at as many positions as possible in the coverage of the wireless energy transmitter device.

The apparatus according to this embodiment of the present application can rapidly determine a corresponding wireless energy transmission scheme based on an orientation of an optical signal from a receiver device.

In a possible implementation, that the first determining module 420 determines the wireless energy transmission scheme comprises determining a transmit phase of the wireless energy, that is, determining phases of some or all of emitter nodes of the transmitter device for transmitting the wireless energy.

In the apparatus according to this embodiment of the present application, the receiving module 410 may comprise or be a photosensitive element. The photosensitive element is consists of a plurality of photosensitive units (pixels), and optical signals in different orientations are received directly or indirectly by photosensitive units at different positions of the photosensitive element. Therefore, the positions of the photosensitive units may be associated with wireless energy transmission schemes, thereby indirectly implement association between the optical signals in different orientations and the wireless energy transmission schemes. For example, each set number (for example, one, four, or eight) of photosensitive units correspond to a set of phase settings of the wireless energy transmitter device, and the set of phase settings comprises a phase settings of some or all of emitter nodes of the wireless energy transmitter device. As shown in FIG. 2(a), an optical signal transmitted by a first receiver device L1 passes through a light splitting apparatus 210 and then is received by a photosensitive unit at a first receive position P1 of a photosensitive element 220, an optical signal transmitted by a second receiver device L2 is received by a photosensitive unit at a second receive position P2, an optical signal transmitted by a third receiver device L3 is received by a photosensitive unit at a third receive position P3, and the photosensitive units at the three receive positions are associated with three groups of phase settings. An association relationship may be stored in the wireless energy transmission control apparatus in a form of lookup table shown in FIG. 3(a). As shown in FIG. 3(a), each entry included in the lookup table comprises a two-dimensional coordinate (x, y) of a receive position on the photosensitive element and a corresponding set of phase settings. The apparatus according to this embodiment of the present application may comprise a storage module configured to store the lookup table.

Figure 5:
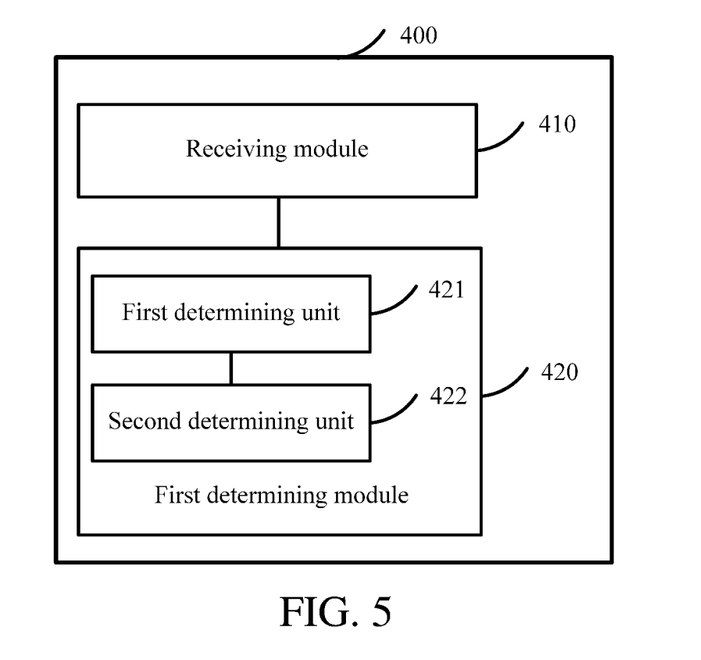
FIG. 5 is an example schematic structural diagram of a first implementation of a wireless energy transmission control apparatus according to an example embodiment of the present application.

Correspondingly, as shown in FIG. 5, the first determining module 420 comprises:

a first determining unit 421, configured to determine a position, at which the optical signal is received, on the photosensitive element, wherein for each photosensitive element, each photosensitive unit has a fixed coordinate position on the photosensitive element. After a photosensitive element at one position receives an optical signal, the optical signal is reflected in a form of charges, and the first determining unit 421 may determine the receive position according to the charges; and a second determining unit 422, configured to determine the transmission scheme according to the position. After the position is determined, the second determining unit 422 may determine, by, for example, looking up the lookup table, the transmission scheme associated with the position.

Optical signals transmitted by receiver devices at different positions (especially referring to different distances from the transmitter device) may have a same transmission direction, and positions of photosensitive units receiving the optical signal may also be the same. As shown in FIG. 2(b), the optical signal transmitted by the third receiver device L3 is received by the photosensitive unit at the third receive position P3, and an optical signal transmitted by a fourth receiver device L4 may also be received by the photosensitive unit at the third receive position P3. Therefore, in order to charging on the receiver device more efficiently, in another possible implementation, the "orientation" may further indicate three-dimensional position information of the receiver device, that is, the "orientation" comprises a transmission direction of an optical signal and a distance between a wireless energy receiver device transmitting the optical signal and a photosensitive element. In this case, positions of photosensitive units of the photosensitive element may still be associated with wireless energy transmission schemes, thereby indirectly implement association between the orientations and the wireless energy transmission schemes. The association relationship may still be learned and stored in a manner of performing offline training at as many positions at possible within coverage of the wireless energy transmitter device, for example, each set number (for example, one, four, or eight) of photosensitive units and a specific distance are associated with a set of phase settings of the wireless energy transmitter device, and the set of phase settings comprises phase settings of some or all of the emitter nodes of the wireless energy transmitter device. The association relationship may be stored in the wireless energy transmission control apparatus in a form of lookup table shown in FIG. 3(b). As shown in FIG. 3(b), each entry included in the lookup table comprises a two-dimensional coordinate (x, y) of a receive position, a distance (z) between a receiver device and the photosensitive element, and a corresponding set of phase settings.

Figure 6:
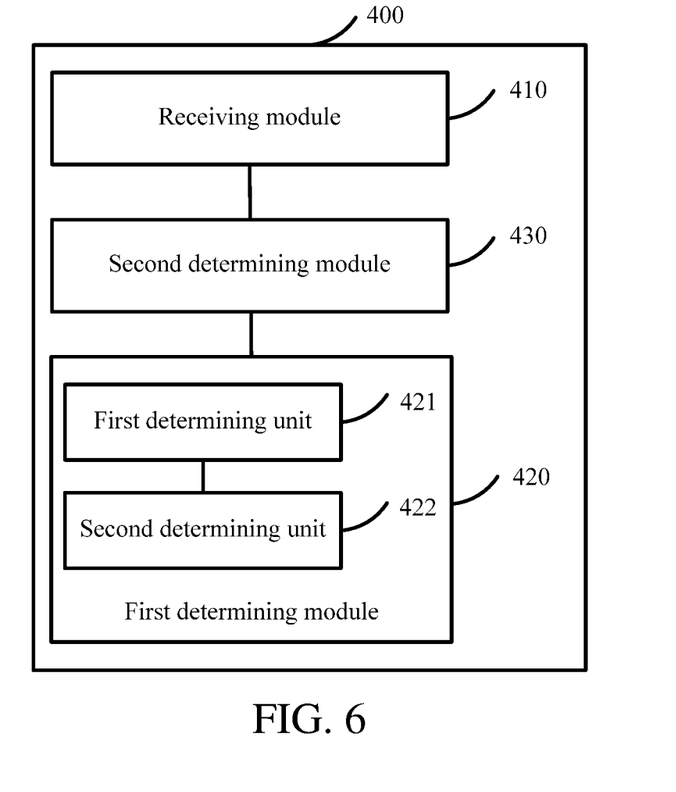
FIG. 6 is an example schematic structural diagram of a second implementation of a wireless energy transmission control apparatus according to an example embodiment of the present application.

In this case, the second determining unit 422 is configured to determine the transmission scheme according to the position and the distance. Correspondingly, as shown in FIG. 6, the apparatus further comprises:

a second determining module 430, configured to determine a distance between the receiver device and the photosensitive element as will be further described below.

In still another possible implementation, the optical signal is used to indicate status information of the receiver device. The status information may comprise at least one of the following information of the receiver device: a remaining power, charging efficiency, and the like. The manner of indicating the status information by using the optical signal may comprise several types, for example, different status information is indicated by using optical signals of different frequencies (colors), wherein a frequency F1 corresponds to a value of the remaining power between 0% and 20%; a frequency F2 corresponds to a value of the remaining power between 20% and 40%; a frequency F3 corresponds to a value of the remaining power between 40% and 60%; a frequency F4 corresponds to a value of the remaining power between 60% and 80%; and a frequency F5 corresponds to a value of the remaining power between 80% and 100%. Optical signals of different intensity indicates different status information, wherein optical intensity I1 corresponds to a high charging efficiency; optical intensity I2 corresponds to a medium charging efficiency; and optical intensity I3 corresponds to a low charging efficiency. The status information status information may be modulated on the optical signal, and in this case, a light source, for example, an LED, that can be used in VLC may be disposed on the receiver device. In this implementation, the first determining module 420 determining the wireless energy transmission scheme may further comprise: determining transmission power of the wireless energy according to the status information. The transmission power refers to the wireless energy transmitted over a unit time. Different transmit power may achieve different transmission power.

Figure 7:
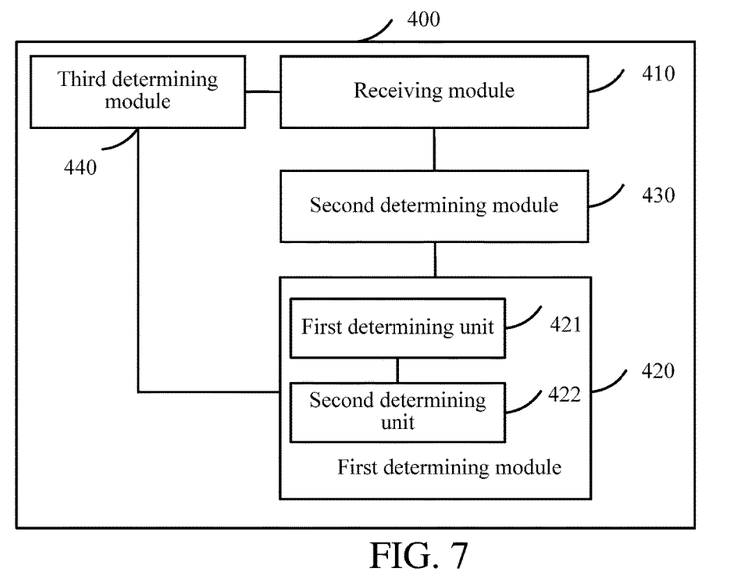
FIG. 7 is an example schematic structural diagram of a third implementation of a wireless energy transmission control apparatus according to an example embodiment of the present application.

Correspondingly, as shown in FIG. 7, the apparatus 400 further comprises:

a third determining module 440, configured to determine the status information of the receiver device. In the case that the status information is indicated by different frequencies or different optical intensity, the third determining module 440 may determine the different frequencies and the different optical intensity by using the photosensitive element, so as to determine corresponding status information. In an implementation in which using data to carry status information, the third determining module 440 obtains the status information by demodulating the optical signal, and the way to demodulate the optical signal is a mature technology in the art.

The second determining module 430 may determine the distance in several ways.

In a possible implementation, the distance may be determined directly in an optical manner by using the photosensitive element. For example, the photosensitive element is a photosensitive element of a TOF camera, and the distance may be obtained directly through measurement in combination with a distance measurement algorithm of the TOF camera.

In another possible implementation, the distance may be determined according to transmit information of the receiver device and receive information of the transmitter device. The transmit information of the receiver device may comprise: a time of transmitting the optical signal by the receiver device, transmit power of transmitting the optical signal by the receiver device, and a modulus of a radiation lobe of the receiver device. The receive information of the transmitter device may comprise: receive power of receiving the optical signal by the transmitter device, channel status information between the transmitter device and the receiver device, a time of receiving the optical signal by the transmitter device, and the like. The distance d may be calculated according to, for example, the following formula (1):

$$P_R = K \frac{1}{d^{n+3}} \quad (1)$$

wherein, $$K = (n+1)A_R h^{n+1} P_T / 2\pi;$$

$P_R$ is the receive power of receiving the optical signal by the transmitter device; $P_T$ is the transmit power of transmitting the optical signal by the receiver device; n is the modulus of the radiation lobe of the receiver device, $n=-\ln(2)/\ln(\cos \Phi_{1/2})$, $\Phi_{1/2}$ indicates a view angle of a light source of the receiver device at half power; $A_R$ is the size of the photosensitive element, h is the channel status information between the transmitter device and the receiver device, and the information may be estimated by the transmitter device based on the received signal.

The distance d may also be calculated according to the following formula (2):

$$d = c(t_R - t_T) \quad (2)$$

wherein, $t_T$ is the time of transmitting the optical signal by the receiver device; $t_R$ is the time of receiving the optical signal by the transmitter device; and c is the speed of light.

Figure 8:
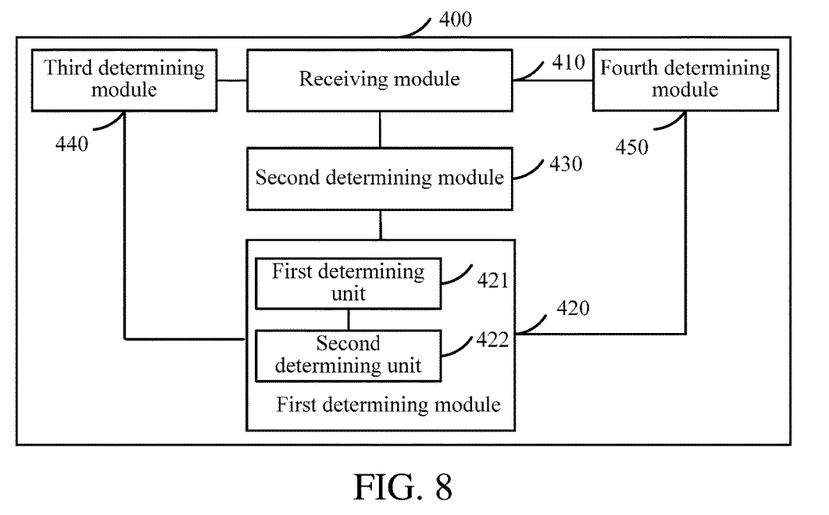
FIG. 8 is an example schematic structural diagram of a fourth implementation of a wireless energy transmission control apparatus according to an example embodiment of the present application.

Correspondingly, as shown in FIG. 8, the apparatus 400 according to this embodiment of the present application further comprises:

a fourth determining module 450, configured to determine the transmit information of the receiver device and the receive information of the transmitter device. Similarly to the status information, the fourth determining module 450 may also obtain the transmit information of the receiver device by demodulating the optical signal. The receive information of the transmitter device may be obtained directly from the transmitter device by the wireless energy transmission control apparatus.

To sum up, the apparatus according to this embodiment of the present application can rapidly determine a phase setting of a transmitter device according to an orientation of an optical signal transmitted by a receiver device, without the need of determining and adjusting transmit phases of all emitter nodes one by one; in addition, proper transmission power may be determined based on the optical signal, so that more targeted energy transmission can be performed, and easy to implement.

Figure 9:
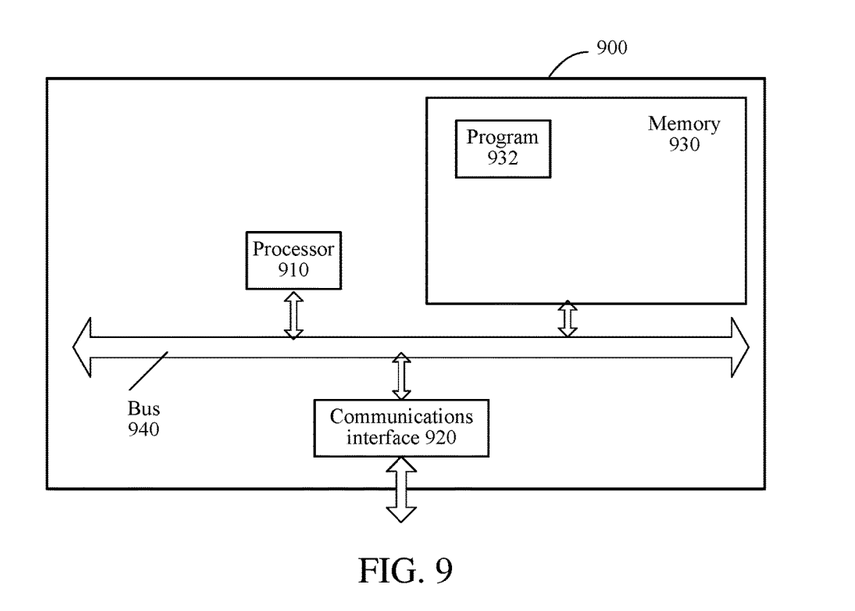
FIG. 9 is an example schematic structural diagram of another wireless energy transmission control apparatus according to an example embodiment of the present application.

FIG. 9 is a schematic structural diagram of another wireless energy transmission control apparatus 900 according to an embodiment of the present application. Specific implementation of the wireless energy transmission control apparatus 900 is not limited by specific embodiments of the present application. As shown in FIG. 9, the wireless energy transmission control apparatus 900 may comprise:

a processor 910, a communications interface 920, a memory 930, and a communications bus 940.

The processor 910, the communications interface 920, and the memory 930 complete mutual communication through the communications bus 940.

The communications interface 920 is configured to communicate with a network element such as a client.

The processor 910 is configured to execute a program 932, and may specifically perform relevant steps in the foregoing method embodiment.

Specifically, the program 932 may comprise program code, wherein the program code comprises a computer operation instruction.

The processor 910 may be a central processing unit (CPU) or an application specific integrated circuit (ASIC), or one or more integrated circuits configured to implement the embodiments of the present application.

The memory 930 is configured to store the program 932. The memory 930 may comprise a high-speed random access memory (RAM) and may also comprise a non-volatile memory, for example, at least one magnetic disk memory.

In a possible implementation, the program 932 may specifically be used to enable the wireless energy transmission control apparatus 900 to perform the following steps:

receiving an optical signal from a wireless energy receiver device; and determining, according to an orientation of the optical signal, a wireless energy transmission scheme of a wireless energy transmitter device corresponding to the orientation.

For specific implementations of the steps in the program 932, reference may be made to corresponding descriptions of the corresponding steps and units in the foregoing embodiments, and details are not provided herein again. It can be clearly understood by a person skilled in the art that, for the purpose of convenient and brief description, for a detailed working process of the described devices and modules, reference may be made to the corresponding process in the foregoing method embodiment, and details are not provided herein again.

A person of ordinary skill in the art should appreciate that, in combination with the examples described in the embodiments in the specification, units and method steps can be implemented by electronic hardware, or a combination of computer software and electronic hardware. Whether the functions are performed by hardware or software depends on specific applications and design constraint conditions of the technical solutions. A person skilled in the art can use different methods to implement the described functions for every specific application, but it should not be considered that this implementation goes beyond the scope of the present application.

When the function is implemented in the form of a software functional unit and sold or used as an independent product, the function may be stored in a computer-readable storage medium. Based on such an understanding, the technical solutions of the present application essentially, or the part contributing to the prior art, or some of the technical solutions may be implemented in a form of a software product. The computer software product is stored in a storage medium, and comprises several instructions for instructing a computer device (which may be a personal computer, a server, a network device, or the like) to perform all or some of the steps of the method described in the embodiments of the present application. The storage medium comprises: any medium that can store program codes, such as a USB disk, a removable hard disk, a read-only memory (ROM), a RAM, a magnetic disk, or an optical disc.

The foregoing implementations are merely intended for describing the present application rather than limiting the present application. A person of ordinary skill in the related art can also make many variations and changes without departing from the spirit and the scope of the present application. Therefore, all the equivalent technical solutions also fall within the scope of the present application, and the patent protection scope of the present application shall be limited by the claims.

What is claimed is:

1. A method, comprising:
   receiving, by a system comprising a processor, an optical signal from a wireless energy receiver device; and
   determining, according to an orientation of the optical signal, a wireless energy transmission scheme of a wireless energy transmitter device corresponding to the orientation.

2. The method of claim 1, wherein, the receiving the optical signal from the wireless energy receiver device comprises:
   receiving the optical signal by a photosensitive element.

3. The method of claim 2, wherein the determining the wireless energy transmission scheme of the wireless energy transmitter device comprises:
   determining a position on the photosensitive element at which the optical signal is received; and
   determining the wireless energy transmission scheme according to the position.

4. The method of claim 2, further comprising:
   determining a distance between the wireless energy receiver device and the photosensitive element.

5. The method of claim 4, wherein the determining the wireless energy transmission scheme of the wireless energy transmitter device comprises:
   determining a position on the photosensitive element at which the optical signal is received; and
   determining the wireless energy transmission scheme according to the position and the distance.

6. The method of claim 1, wherein the determining the wireless energy transmission scheme of the wireless energy transmitter device comprises:
   determining a phase of the wireless energy transmitter device for transmitting wireless energy.

7. The method of claim 6, wherein at least one position on the photosensitive element is associated with a phase setting of the wireless energy transmitter device for transmitting the wireless energy.

8. The method of claim 7, wherein the optical signal is used to indicate status information of the wireless energy receiver device, and wherein the determining the wireless energy transmission scheme of the wireless energy transmitter device further comprises:
  determining a transmission power of the wireless energy according to the status information.

9. The method of claim 8, further comprising:
  determining the status information of the wireless energy receiver device.

10. The method of claim 9, wherein the determining the status information of the wireless energy receiver device comprises:
  obtaining the status information by demodulating the optical signal.

11. The method of claim 9, wherein the determining the status information of the wireless energy receiver device comprises:
  determining the status information according to a frequency or an intensity of the optical signal.

12. The method of claim 4, wherein the determining the distance between the wireless energy receiver device and the photosensitive element comprises:
  determining the distance by the photosensitive element.

13. The method of claim 4, wherein the optical signal is used to indicate transmit information of the wireless energy receiver device, and wherein
  the determining the distance between the wireless energy receiver device and the photosensitive element comprises:
  determining the distance according to the transmit information of the wireless energy receiver device and receive information of the wireless energy transmitter device.

14. The method of claim 13, further comprising:
  determining the transmit information of the wireless energy receiver device and the receive information of the wireless energy transmitter device.

15. The method of claim 14, wherein, the determining the transmit information of the wireless energy receiver device and the receive information of the wireless energy transmitter device comprises:
  obtaining the transmit information of the wireless energy receiver device by demodulating the optical signal.

16. The method of claim 15, wherein the determining the transmit information of the wireless energy receiver device and the receive information of the wireless energy transmitter device comprises:
  obtaining the receive information of the wireless energy transmitter device from the wireless energy transmitter device.

17. The method of claim 8, wherein the status information comprises: a remaining power or a charging efficiency of the wireless energy receiver device.

18. The method of claim 13, wherein the transmit information of the wireless energy receiver device comprises at least one of a time of transmitting the optical signal by the wireless energy receiver device, a transmit power of transmitting the optical signal by the wireless energy receiver device, or a modulus of a radiation lobe of the wireless energy receiver device.

19. The method of claim 18, wherein the receive information of the wireless energy transmitter device comprises at least one of a receive power of receiving the optical signal by the wireless energy transmitter device, channel status information between the wireless energy transmitter device and the wireless energy receiver device, and a time of receiving the optical signal by the wireless energy transmitter device.

20. An apparatus, comprising:
  a memory that stores executable modules; and
  a processor, coupled to the memory, that executes or facilitates execution of the executable modules, comprising:
  a receiving module configured to receive an optical signal from a receiver device for reception of wireless energy; and
  a first determining module configured to determine, according to an orientation of the optical signal, a transmission scheme corresponding to the orientation of a transmitter device for transmission of the wireless energy.

21. The apparatus of claim 20, wherein the receiving module receives the optical signal by a photosensitive element.

22. The apparatus of claim 21, wherein the first determining module comprises:
  a first determining unit configured to determine a position at which the optical signal is received on the photosensitive element; and
  a second determining unit configured to determine the transmission scheme according to the position.

23. The apparatus of claim 21, wherein the executable modules further comprise:
  a second determining module configured to determine a distance between the receiver device and the photosensitive element.

24. The apparatus of claim 23, wherein the first determining module comprises:
  a first determining unit configured to determine a position at which the optical signal is received on the photosensitive element; and
  a second determining unit configured to determine the transmission scheme according to the position and the distance.

25. The apparatus of claim 20, wherein the first determining module is configured to determine a phase of the transmitter device for the transmission of the wireless energy.

26. The apparatus of claim 25, wherein at least one position on the photosensitive element is associated with a phase setting of the transmitter device for transmission of the wireless energy.

27. The apparatus of claim 26, wherein the optical signal is used to indicate status information of the receiver device; and
  the first determining module is further configured to determine transmission power of the wireless energy according to the status information.

28. The apparatus of claim 27, wherein the executable modules further comprise:
  a third determining module configured to determine the status information of the receiver device.

29. The apparatus of claim 28, wherein the third determining module obtains the status information by demodulating the optical signal.

30. The apparatus of claim 28, wherein the third determining module determines the status information according to a frequency or an intensity of the optical signal.

31. The apparatus of claim 23, wherein the second determining module determines the distance by the photosensitive element.

32. The apparatus of claim 23, wherein the optical signal is used to indicate transmit information of the receiver device; and the second determining module determines the distance according to the transmit information of the receiver device and receive information of the transmitter device.

33. The apparatus of claim 32, wherein the executable modules further comprise:
a fourth determining module configured to determine the transmit information of the receiver device and the receive information of the transmitter device.

34. The apparatus of claim 33, wherein the fourth determining module obtains the transmit information of the receiver device by demodulating the optical signal.

35. A computer readable storage device, comprising at least one executable instruction, which, in response to execution, causes a system comprising a processor to perform operations, comprising:
receiving an optical signal from a wireless energy receiver device; and
determining, according to an orientation of the optical signal, a wireless energy transmission protocol of a wireless energy transmitter device corresponding to the orientation.

36. A device for wireless energy transmission control, comprising a processor and a memory, wherein the memory stores executable instructions, the processor being connected with the memory via a communication bus, and when the device is operating, the processor executes or facilitates execution of the executable instructions stored by the memory to cause the device to perform operations, comprising:
receiving an optical signal from a wireless energy receiver device; and
determining, according to an orientation of the optical signal, a wireless energy transmission scheme of a wireless energy transmitter device corresponding to the orientation.

* * * * *